US006621591B2

(12) United States Patent
Kramer et al.

(10) Patent No.: US 6,621,591 B2
(45) Date of Patent: Sep. 16, 2003

(54) METHOD AND APPARATUS FOR PRINTING AN INFORMATION-BASED INDICIA PROGRAM (IBIP) POSTAGE FROM A DOCUMENT INSERTER

(75) Inventors: Allen L. Kramer, Middletown, CT (US); Patrick Rolling, Cheshire, CT (US)

(73) Assignee: Pitney Bowes Inc., Stamford, CT (US)

(*) Notice: Subject to any disclaimer, the term of this patent is extended or adjusted under 35 U.S.C. 154(b) by 78 days.

(21) Appl. No.: 09/747,148

(22) Filed: Dec. 22, 2000

(65) Prior Publication Data

US 2002/0078663 A1 Jun. 27, 2002

(51) Int. Cl.[7] ............................................... G06K 15/00
(52) U.S. Cl. ...................................... 358/1.15; 358/1.1
(58) Field of Search ..................... 358/1.1, 1.9, 1.13, 358/1.15, 1.17, 1.18; 382/101, 287, 291, 292, 317; 705/401, 408, 410; 707/100

(56) References Cited

U.S. PATENT DOCUMENTS 5,770,841 A * 6/1998 Moed et al. ................ 235/375
5,822,739 A * 10/1998 Kara .......................... 705/410
5,930,796 A * 7/1999 Pierce et al. ................ 707/100
6,026,385 A * 2/2000 Harvey et al. .............. 705/408
6,249,777 B1 * 6/2001 Kara et al. .................. 705/404
6,360,001 B1 * 3/2002 Berger et al. ............... 382/101

* cited by examiner

Primary Examiner—Gabriel Garcia
(74) Attorney, Agent, or Firm—Ronald Reichman; Angelo N. Chaclas

(57) ABSTRACT

A method and apparatus for printing an information-based indicia program (IBIP) address and postage in a document inserter mailing system is disclosed wherein a third-party word processing software with mail merge capabilities generates text and a matching address is used as the input for a client application in high-volume document processing and mail systems without programmatically altering the word processing program to accommodate the printing subsystem. Addresses are validated and corrected in the printing subsystems prior to creation of the indicia image and address image to be printed on the mailpiece. One or more documents are inserted into the corresponding address matched envelope, which is sealed and has appropriate postage affixed prior to placement in the delivery stream.

1 Claim, 2 Drawing Sheets

METHOD AND APPARATUS FOR PRINTING AN INFORMATION-BASED INDICIA PROGRAM (IBIP) POSTAGE FROM A DOCUMENT INSERTER

CROSS REFERENCE TO RELATED APPLICATIONS

Reference is made to application Ser. No. 09/747,150, entitled APPARATUS AND METHOD FOR PRINTING AN INFORAMTION-BASED INDICIA PROGRAM (IBIP) POSTAGE IN A PRINTER DRIVER SYSTEM, assigned to the assignee of this application and filed on even date herewith.

TECHNICAL FIELD

The present invention relates generally to the field of document production and mailing systems and deals more particularly with a document and envelope matching printing system, more specifically with the creation of Information-Based Indicia Program (IBIP) indicia with specialized printers in a document and envelope matching printing system, such as the Pitney Bowes DocuMatch printing system.

BACKGROUND OF THE INVENTION

The challenges of mail delivery within the United States and in the growing ranks of industrialized countries has grown so that in the United States alone, the postal service delivers upwards of 900 million pieces of mail per day. Added to the growing postal burden are the requirements of keeping address data accurate and readable by both mail handling machines and the mail carriers that physically deliver the mail. With the need to reduce costs while improving the efficiency and reliability of postal operations, continuous review of the methodology and the systems used to implement operations is required. Thus, the growing burden of delivering mail efficiently results in the development of regulations by the United States Postal Service (USPS) that are designed to take the best possible advantage of the technology available for mail handling.

Among the changes and requirements instituted by the United States Postal Service is the Information-Based Indicia Program (IBIP). Companies, such as the present assignee, are developing and introducing new document printing and handling systems that comply with the IBIP standards and criteria set by the USPS. As printing, post-processing and mailing technologies have become more sophisticated, separate processes for document preparation and distribution have emerged, particularly in high speed, high volume document production and mailing systems. New printing technology has introduced new standards and new print languages to accommodate complex printing functions. Mail finishing requirements, such as bar codes and different coding methodologies, have become more data dependent; for example, encoding destination identification. Sorting and inclusion of targeted marketing documents, information and precisional communication documents have further increased the complexity of document production and mailing systems. Companies that generate such mail on a regular basis typically need to change their specific applications each time the postal regulations change and also change the data format to accommodate newer technology printers. Applicant's print stream processing technology, generally known by the trademark Stream Weaver®, substantially eliminates the need to modify existing applications to accommodate the changes in postal regulations and to accommodate newer printing technologies by addressing the changes further downstream in the document preparation cycle. Generally, however, the documents and addresses are generated by legacy or application-specific programs designed to operate with the document production system.

The advent of personal computers and high-quality printers has led to a number of third-party word processing application programs that have the capability to generate an addressed, matched mailing wherein the document is matched with the envelope address using the mail merge capabilities of the application. PC applications such as Microsoft® Word® generate mail using printer-generated indicia on commercially available printers. It would be desirable to use such third party applications in document and envelope matching printing systems, such as the Docu-Match printing system, for example, produced by applicant without programmatically altering the third party application to accommodate the printer drivers of the printing system.

Therefore, it is an object of the present invention to provide for a method and apparatus for printing Information-Based Indicia Program (IBIP) indicia in a document and envelope matching printing system using the mail merge capabilities of a third-party application.

It is a further object of the present invention to provide for a method and apparatus for verifying and correcting postage to produce an IBIP indicia when a valid address is created.

It is a yet further object of the present invention to provide for a method and apparatus for inserting documents into an envelope and printing an IBIP postage and address on the mailpiece.

SUMMARY OF THE INVENTION

The present invention substantially obviates, if not entirely eliminates, the disadvantages of utilizing a third-party word processing application having mail merge capabilities in a document and envelope matching printing system by extending IBIP indicia generation to specialized printers used in such systems.

The first aspect of the present invention is a method for printing an IBIP indicia to a mailpiece in a mailing system for creating at least one mailpiece. The method comprises the steps of: initiating a user application for producing the mailpieces, wherein the user application processes a set of documents having one or more addresses contained therein; printing the documents to a printer driver as a print stream; determining which information contained within each one of the documents is textual information and which information is control code information; removing the control code information from the document; sending the textual information to a print stream processor module which parses the address from the textual information and sends the textual information to a document printer, and sends the parsed address to an address correction/coder component to assure that a valid address has been processed; determining that each one of the addresses is valid, and if the address is not valid, then correcting the address to make it valid; and sending the valid address to an IBIP indicia generator to create an indicia image and an address image to be printed on the mailpiece.

The second aspect of the present invention is apparatus in a mailing system for creating and printing an IBIP indicia to a mailpiece. The system comprises: means for producing a user application having one or more mailpieces, wherein the user application processes a set of one or more documents having one or more addresses contained therein; means for printing the documents to a printer driver as a print stream; means for determining which information contained within each one of the documents is textual information and which information is control code information; a print stream processor module for parsing the addresses from the textual information and for sending the textual information to a document printer and for sending the parsed address to an address correction/coder component means to assure that a valid address has been processed; means for determining that each one of the addresses is valid, and for correcting the address if said address is not valid to make it valid; and IBIP indicia generator means for creating an indicia image and an address image to be printed on said mailpiece in response to receipt of a valid address.

Other features and advantages of the present invention will become more apparent from an understanding of the following detailed description of presently preferred embodiments of the invention when considered in conjunction with the accompanying drawings.

DETAILED DESCRIPTION

Figure 1:
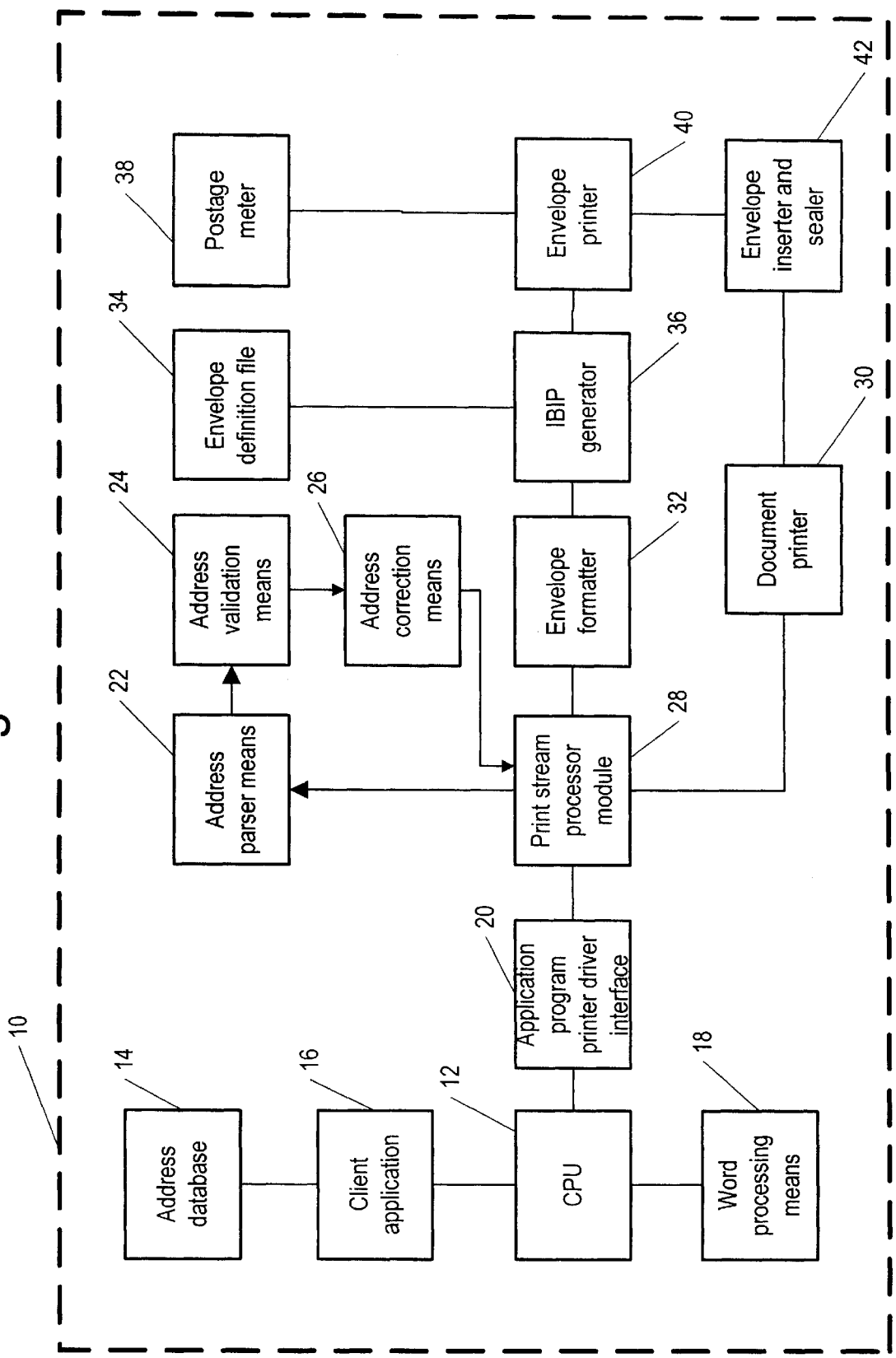
FIG. 1 is a schematic functional block diagram of a document and envelope matching printing system embodying the method of the present invention.

Turning to FIG. 1, a typical document and envelope matching printing and mailing system that could employ the subject invention is shown therein and is generally designated 10.

The mailing system 10 is comprised of a central processing unit (CPU) 12 with an address database 14 cooperatively connected to a client application 16 and a word processing means, generally designated 18. The word processing means 18 is an application program, such as, for example, Microsoft® Word® or WordPerfect®, and has mail merge capabilities to produce an address-matched mailing wherein a document and envelope have a matched address and/or addressee. The text of the document or documents together with targeted selections or criteria typically is input through the client application 16, and the address database 14 is generally in the form of a mailing list comprised of successive address fields. The address fields are typically parsed and combined by means of the CPU 12, which controls the word processing means 18 software application program to print or forward each successive document to an application program printer driver interface 20. It will be understood that such word processing means have a master or template document wherein various fields are identified and during the processing mode the specific designated fields, such as the address fields and the addressee name are inserted from a formatted table to produce the desired document. The application program printer driver interface 20 sends all print data to the print stream processor module 28. In the present mailing system 10, the address is parsed by the address parsing means 22 which separates the text information from the address information. The address information is checked for accuracy and compliance with USPS formatting regulations by the address validation means 24. If it is determined that the address is not valid, an address correction means 26 corrects the identified defects and forwards the validated address or corrected address as the case may be back to the print stream processor module 28. The print stream processor module information is output to a document printer 30 to produce the desired document. The print stream processor module 28 also inputs the address information to an envelope formatter 32, which formats the envelope in accordance with information contained in an envelope definition file for placement of the destination address, return address, barcode, postage or other indicia or image to be printed on the envelope face. The envelope formatted information is passed to the IBIP generator to produce the IBIP postage indicia in accordance with the value indicated by the postage meter 38 and forwards the postage indicia image and address image to the envelope printer 40. The printed envelopes may be fed from the printer 40 to an envelope inserter and sealer 42 that inserts documents fed to it from the document printer 30 to produce a matched mailpiece for placement into the delivery stream.

It will be understood that the individual components of the mailing system 10 are generic and are generally known in the mailing, document production and addressing arts, and integrated systems such as the DocuMatch system from Pitney Bowes Inc. are known to combine the features and capabilities of several of the components of the mailing system 10.

Figure 2:
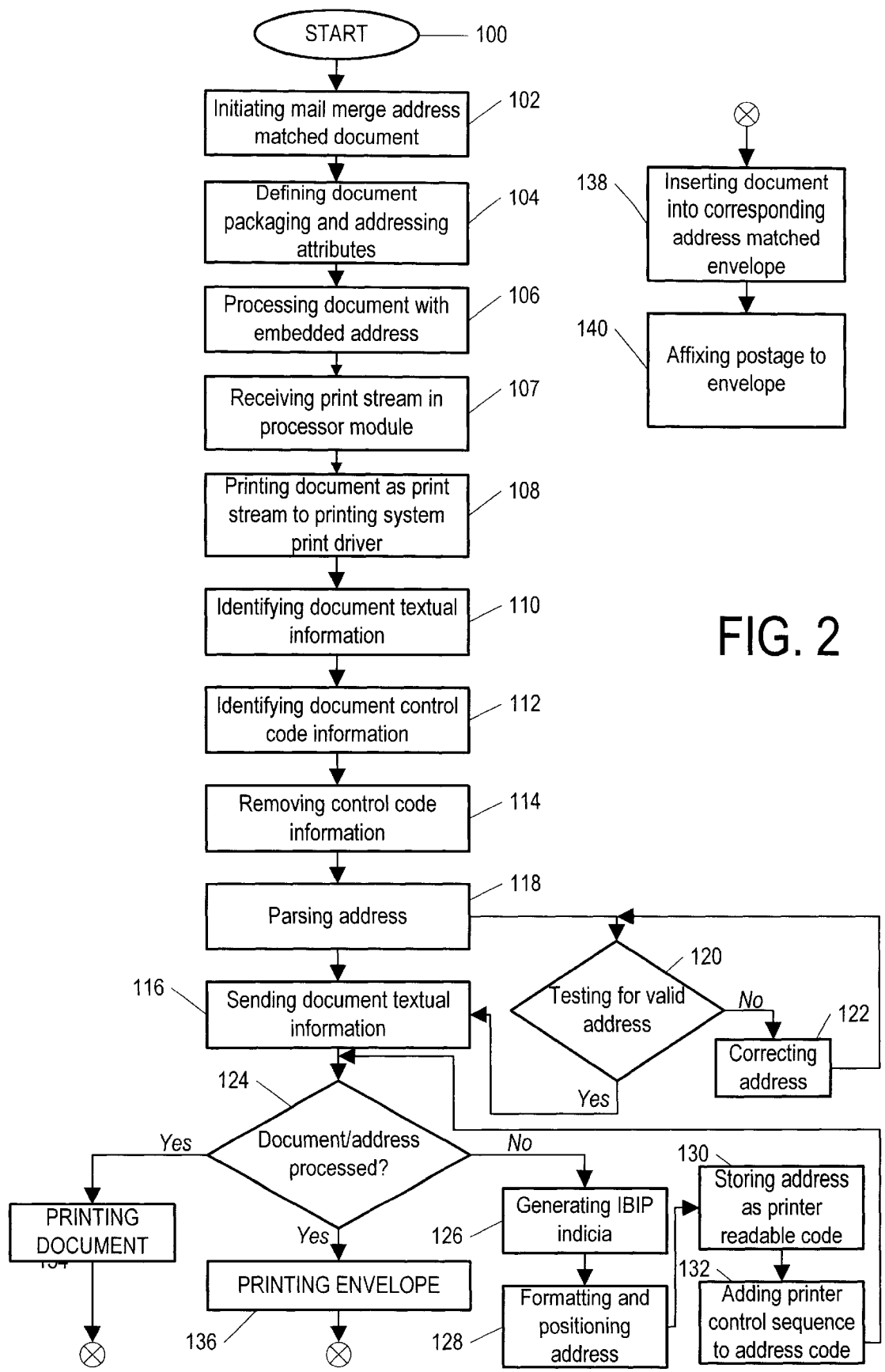
FIG. 2 is a flow chart showing the method of the present invention for printing an IBIP indicia postage from a document inserter.

Turning now to FIG. 2, a flow chart showing the method of the present invention for creating and printing an IBIP indicia postage and address in a mailing system is illustrated therein. The method of the mailing system begins at the "START" step 100. The method first advances to step 102, wherein the mailpiece production is initiated utilizing a third-party application such as Microsoft® Word® to produce an address-matched mailing using the mail merge capabilities of the word processing application. Under the method of the invention, the client application does not need to be programmatically altered because the formatting, control, document setup, page attributes and the like are selected through the third-party word processing software application. Once the mailpiece production is initiated in step 102 using the mail merge capabilities, the document packaging and addressing attributes are defined by the user in step 104. The method then advances to step 106 to process the document with an embedded address. The address information is typically input from an address database or may be individually inserted in accordance with the third party application. Once the document is processed with the embedded address in step 106, the method moves to step 107, wherein the processed document of step 106 is sent to a printer driver as a print stream. The printer driver in step 107 converts the print stream into a document description format and sends it to the print stream processor module 108. The print stream processor module in step 108 has means for determining in step 110 which information in the print stream is textual information and in step 112 which information is control code information. The print stream processor module then removes the control code information as indicated in step 114 and sends the textual information to the document printer as indicated in step 116. In addition, the print stream processor module parses the addresses as shown in step 118 and sends the parsed address information to an address validation correction test as shown in step 120. The address is tested for validity and compliance with USPS regulations. Software such as SMART MAILER™ mail management software available from Pitney Bowes Inc. of Stamford, Conn., operates to find duplicate addresses, detect undeliverable addresses and, where possible, corrects the errors in the address as indicated by the address correction method step 122. In the valid address method step 120, the ZIP code is also examined and a ZIP+4 code is provided where necessary. The output of the valid address method test step 120 is output to the document printer method step 116. The system then moves to inquire if the document or address has been processed as shown in method step 124. If the document or address has not been processed, the system moves to the generating IBIP indicia step 126 to produce the IBIP indicia required. The system then moves to the formatting and positioning address method step to create the address image to be printed on the envelope in accordance with the addressing attributes. The IBIP indicia and formatting and positioning are stored as printer readable codes as shown in the method step 130. The system then moves to method step 132 to add a printer control sequence to the address code in accordance with the specific printer utilized in the mailing system. Once the document and addresses are processed as indicated in method step 124, the system moves to print the document as indicated by method step 134 using the system's document printer and prints the corresponding address matched envelope as shown in method step 136 utilizing the envelope printer of the mailing system. The system then moves to method step 138 which inserts the document or documents into the corresponding address matched envelope which is then sealed. Finally, the system moves to method step 140 wherein the appropriate postage is affixed to the envelope prior to placing it in the delivery stream.

In the valid address test method step 120 and address correction method step 122, flags or special control codes are used to determine what needs to be done if an address is determined not to be valid. Such actions are, for example, "don't print this address and start processing the next address"; "print address without affixing postage to the envelope"; "cancel the job"; "change the address to a correct address if possible"; and prompt the user to choose a specific desired action to take.

If a valid address as determined in the valid address method step 120 or as corrected by the address correction step 122 is passed to the create indicia image method step 126, flags or special control codes are used to describe the behavior of the printing system if the indicia cannot be generated; for example, there is "no postage meter" or there is "insufficient postage" in the meter. Typical actions may include notification of "don't print this address and start processing the next address"; "print address without affixing postage to the envelope"; "cancel the job"; "refill meter"; and prompt the user to choose a specific desired action to take.

It is to be understood that the present invention is not to be considered as limited to the specific embodiments described above and shown in the accompanying drawings, which merely illustrate the best mode presently contemplated for carrying out the invention, and which is susceptible to such changes as may be obvious to one skilled in the art, but rather that the invention is intended to cover all such variations, modifications and equivalents thereof as may be deemed to be within the scope of the claims appended hereto.

What is claimed is:

1. In a mailing system for creating at least one mailpiece, a method for printing an Information-Based Indicia Program (IBIP) indicia to a mailpiece, said method comprising the steps of:

(a) initiating a user application for producing one or more mailpiece, wherein said user application processes a set of one or more documents having one or more addresses contained therein;

(b) printing said one or more documents to a printer driver for processing as a print stream that is generated by computer commands;

(c) sending said print stream information to a print stream processor module;

(d) determining, at said print stream processor module, which information contained within each one of said one or more documents is textual information and which information is control code information;

(e) removing said control code information from said document;

(f) parsing the one or more addresses from said textual information and sending said textual information to a document printer, and sending said parsed one or more addresses to an address correction/coder component to assure that a valid address has been processed;

(g) determining that each one of said one or more addresses is valid, and if said address is not valid, then correcting said address to make it valid;

(h) sending said valid address to an IBIP indicia generator to create an indicia image and an address image to be printed on said one or more mailpiece;

(i) printing said document at said document printer;

(j) printing an envelope at an envelope printer; and (k) inserting said printed document into said printed envelope.

* * * * *